US012081131B2

(12) United States Patent
Jain et al.

(10) Patent No.: US 12,081,131 B2
(45) Date of Patent: Sep. 3, 2024

(54) POWER CONVERTER COMPRISING SERIES RESONANT CONVERTER(S) HAVING A FULL-BRIDGE SERIES RESONANT TOPOLOGY AND METHODS OF OPERATING SAME

(71) Applicant: TRANSIENT PLASMA SYSTEMS, INC., Torrance, CA (US)

(72) Inventors: Praveen Jain, Kingston (CA); Haibo Zhang, Kanata (CA); Arpan Laha, Kingston (CA)

(73) Assignee: TRANSIENT PLASMA SYSTEMS, INC., Torrance, CA (US)

( * ) Notice: Subject to any disclaimer, the term of this patent is extended or adjusted under 35 U.S.C. 154(b) by 222 days.

(21) Appl. No.: 17/871,036

(22) Filed: Jul. 22, 2022

(65) Prior Publication Data

US 2023/0032942 A1 Feb. 2, 2023

Related U.S. Application Data

(60) Provisional application No. 63/228,462, filed on Aug. 2, 2021.

(51) Int. Cl.
*H02M 3/335* (2006.01)
*H02M 3/00* (2006.01)

(52) U.S. Cl.
CPC ....... *H02M 3/33569* (2013.01); *H02M 3/015* (2021.05)

(58) Field of Classification Search
CPC .................. H02M 3/33569; H02M 3/015
See application file for complete search history.

(56) References Cited

U.S. PATENT DOCUMENTS

| 7,817,452 | B2 | 10/2010 | Smith |
| 9,190,911 | B2 | 11/2015 | Dai et al. |
| 9,419,531 | B2 | 8/2016 | Zhilun et al. |
| 9,490,704 | B2 | 11/2016 | Jang et al. |

(Continued)

FOREIGN PATENT DOCUMENTS

| CN | 102480222 B | 5/2015 |
| CN | 107241020 A | 10/2017 |

(Continued)

OTHER PUBLICATIONS

International Search Report and Written Opinion for PCT/US2022/038047 dated Nov. 16, 2022, 6 pages.

(Continued)

*Primary Examiner* — Sisay G Tiku
(74) *Attorney, Agent, or Firm* — Cozen O'Connor

(57) ABSTRACT

A DC-DC power converter employs a full bridge series resonant converter topology with a resonant tank and two transformers, one before and one after the resonant tank, to obtain a high voltage (e.g., approximately 300V, approximately 1500V or greater) output from a relatively low voltage (e.g., approximately 9V-16V) input, for instance an input from one or more battery cells. DC-DC power converter is operable to output high voltage (e.g., around 300V, 1500V or higher) short duration pulses (e.g., tens of nanoseconds or less). A burst mode control technique provides as good regulation characteristics at light loads. Instead of turning OFF the active switches during an OFF period, the switches are operated at a different frequency (e.g., higher frequency) during the OFF period than a frequency at which the switches are turned ON during the ON period. Auxiliary loads can also be supplied.

21 Claims, 4 Drawing Sheets

(56) References Cited

U.S. PATENT DOCUMENTS

| | | |
|---|---|---|
| 9,490,709 B2 | 11/2016 | Lee et al. |
| 10,090,772 B2 | 10/2018 | Perreault et al. |
| 10,404,182 B1 | 9/2019 | Abdel-Rahman |
| 2009/0303753 A1* | 12/2009 | Fu .................. H02M 3/01 363/20 |
| 2014/0254203 A1* | 9/2014 | Dai .................. H02M 3/01 363/17 |
| 2014/0362612 A1 | 12/2014 | Shi et al. |
| 2015/0381064 A1* | 12/2015 | Matsubara ........ H02M 3/33584 363/17 |
| 2018/0278229 A1 | 9/2018 | Sankaran et al. |
| 2018/0375441 A1* | 12/2018 | Lin .................. H03F 3/2176 |
| 2020/0177089 A1* | 6/2020 | Abdel-Rahman ....... H02M 1/36 |
| 2022/0014099 A1* | 1/2022 | Kim .................. H02M 1/083 |

FOREIGN PATENT DOCUMENTS

| | | | |
|---|---|---|---|
| CN | 105553252 B | | 1/2018 |
| CN | 117277820 A | * | 12/2023 |
| CN | 117394706 A | * | 1/2024 |
| EP | 3661038 A1 | * | 6/2020 ............ H02J 7/0068 |
| IN | 201621001282 A | | 2/2016 |
| JP | 2006254577 A | | 9/2006 |
| KR | 20150017433 A | | 2/2015 |
| KR | 102488223 B1 | * | 1/2023 |
| WO | 2014093023 A1 | | 6/2014 |
| WO | WO-2015004989 A1 | * | 1/2015 ........ H02M 3/33546 |
| WO | 2016196545 A1 | | 12/2016 |

OTHER PUBLICATIONS

"Bidirectional DC-DC Converter Reference Design for 12-V/48-V Automotive Systems," TI Designs: TISA-01168, Texas Instruments, TIDUCS2B, Jun. 2017, revised Mar. 2018. 80 pages.

Gu, B., et al., "Hybrid-Switching Full-Bridge DC-DC Converter with Minimal Voltage Stress of Bridge Rectifier, Reduced Circulating Losses, and Filter Requirement for Electric Vehicle Battery Chargers," IEEE Trans. Power Elect., 28(3) pp. 1132-1144, 2013.

* cited by examiner

POWER CONVERTER COMPRISING SERIES RESONANT CONVERTER(S) HAVING A FULL-BRIDGE SERIES RESONANT TOPOLOGY AND METHODS OF OPERATING SAME

COPYRIGHT NOTICE

The disclosure of this patent document contains material that is subject to copyright protection owned Transient Plasma Systems, Inc. ©Transient Plasma Systems, Inc. 2021. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure generally relates to power converters and methods of operating the same, and more particularly relates to direct current to direct current (DC-DC) power converters that include one or more series resonant converters having a full-bridge series resonant topology where a control circuit operates a set of active switches and which, during an ON period when power is to be supplied to a load operates the switches at a first frequency, and during an OFF period when power is not to be supplied to the load operates the switches at a second frequency. Such may advantageously be used to generate pulses, in particular short pulses (e.g., with pulse durations on the order of a tens of nanosecond or less) with a relatively high voltage (e.g., 300V, 1500V).

BRIEF SUMMARY

Pulsed power systems that generate pulses with durations that are tens of nanoseconds and faster are typically open loop systems, allowing an operator to set parameters such as output voltage, pulse repetition rate, and number of pulses generated in a burst of pulses.

Described herein is a DC-DC power converter useful in a pulse generator circuit. Applicant has designed a DC-DC power converter that may be particularly useful in short duration pulse generation, for example for use in automotive applications. As such, the described DC-DC power converter is operable to receive a relatively low voltage (e.g., 9V-16V), for example form one or more battery cells, and to output high voltage (e.g., around 300V, around 1500V or higher) pulses. A load could be driven by high current half-sinusoidal bursts (e.g., of 92 A (maximum)) with pulse durations of about 1 μs, with gaps between the bursts with a gap duration (e.g., 9 μs), when the converter was in no load condition. The described DC-DC power converter is also able to provide power to auxiliary loads, for instance: 4×20V, 0.25 A auxiliary loads; a 1×24V, 1 A auxiliary load; 1×10V, 0.5 A auxiliary load; 1×5V, 2 A auxiliary load; and a −5V, 1 A auxiliary load. The described DC-DC power converter is suitable to perform in automotive under-the-hood applications (e.g. air temperature −29 degree C. to 121 degree C.). The described DC-DC power converter also advantageously has a small package size (e.g. 8 inch×4.5 inch×3 inch).

To realize such, it would be desirable to be able to obtain a high output voltage (e.g., around 300V, around 1500V or higher) from a relatively low input voltage (e.g., 9V-16V), for instance voltages supplied via chemical battery cells typically employed as starter or auxiliary (i.e., non-traction) batteries in automotive applications. The choice of target output voltage between (e.g., 300V-1500V) is determined by the end application and required pulse voltage.

Such could possibly be obtained by using a high gain topology with consideration given to size, cost, power, efficiency, control, thermal, EMI and isolation requirements.

High gain topologies may take the form of hard-switched converters, for example employing flyback topologies, boost or full bridge topologies with transformers, coupled inductors or voltage multiplier circuits. In hard switched converters, the switching frequency must be kept low (e.g., <20 kHz) to minimize switching losses. This leads to an increase in the size of the magnetic components, and hence to an increase in the overall size of the converter. If operated at high frequencies, switching losses can cause overheating of the switches and a reduction in the overall efficiency of the converter.

Soft switched converters can overcome the switching losses by achieving zero-voltage switching (ZVS) or zero-current switching (ZCS). This enables operation at higher frequencies, which in turn reduces the size of the magnetics. Commonly used soft switched converters are resonant converter topologies, e.g., series, parallel and series-parallel (LLC and LCC) topologies. The inherent gain of a resonant tank of such converters is not high, hence transformers are included to achieve the required gain and to provide the required isolation. The series resonant converter is the simplest topology, with a resonant inductor and capacitor connected in series between an inverter and rectifier circuit. The inherent benefit of the series resonant converter is it has much higher light load efficiency as compared to other resonant topologies. This is particularly useful in automotive applications because of the pulsed nature of the load where the converter operates in very light load conditions for a significant amount of time.

A major drawback of the series resonant converter is the wide frequency variation required for voltage regulation for converter designs with low quality factor. Designs with higher quality factor provide improved regulation capability but typically increase the current and voltage stresses across the components, hence designs with lower Q-factor tend to be preferred. With high input voltage range and light load operation specifications, conventional control techniques like frequency modulation should be used due to the associated very high range of switching frequency requirements. This leads to sub-optimal design of magnetic components. Hence other modulation techniques like phase-shift control or asymmetrical pulse width modulation (APWM) can be used in conjunction with frequency control. However, at higher input voltages and very light loads, there is a possibility of losing ZVS. This is of particular concern since the converter specifications includes a wide input voltage range (9V-16V) and operation primarily in very light load conditions with very high current bursts in between. The converter is not rated for a very high power and hence cannot provide energy to the load during the load bursts. During that period, the output capacitor provides the required energy.

Described herein is a full bridge series resonant converter topology with a resonant tank and two transformers, one before and one after the resonant tank, to obtain a high voltage (e.g., approximately 300V, approximately 1500V or greater) output from a relatively low voltage (e.g., approximately 9V-16V) input, for instance an input from one or more battery cells. The choice of target output voltage between (e.g., 300V-1500V) is determined by the end application and required pulse voltage.

To overcome the problems associated with conventional control, a burst mode control technique is described herein which has good regulation characteristics at light load. However instead of turning OFF all the switches during the OFF period, the switches are operated at a higher frequency. Alternatively, the instead of turning OFF all the switches during the OFF period, the switches are operated at a lower frequency. This advantageously allows a smaller overshoot or undershoot across the input filter and hence less ripple is reflected back to the input source (e.g., battery). This also advantageously improves dynamic response by allowing quicker switching between ON and OFF states of the converter during the ON and OFF periods. A feedforward control can also be implemented, which senses the input voltage and sets the operating frequency accordingly. This controls the gain of the power converter and reduces the stresses and root mean square (rms) currents through the components.

The described power converter can include additional circuits to supply various auxiliary loads employs, and can even include another series resonant converter to supply one or more auxiliary loads.

The described power converter employs a full-bridge series resonant topology to advantageously obtain zero voltage switching at the inverter switches. This topology is simple and has a small size compared to other types of resonant converters. It also has good dynamic performance and light load efficiency which is particularly advantageous for generating short duration high voltages pulses, for example for use in, but not limited to, automotive applications. The described power converter advantageously employs two transformers to obtain the desired gain, one of the transformers connected before the resonant tank and the other transformer connected after the resonant tank. The desired gain is, for example, on the order of 18 to 167 times the input voltage, or alternatively 94 to 167 times the input voltage, which is not practically achievable by a single transformer.

The described power converter advantageously employs a hysteretic control for output voltage regulation since the power converter operates in very light load conditions for an extended period. Instead of completely switching OFF the power converter during the OFF period, the switching frequency is increased (e.g., gradually increased), for example to twice its value during the ON period, so as to minimize the overshoots and undershoots in the input filter during the transients. In the ON period, the switching frequency is reverted (e.g., gradually reverted) to its original value. A feedforward control can be used to change the operating frequency according to the input voltage, so that the voltage stresses and rms currents through the components are within reasonable limits.

The foregoing summary does not encompass the claimed subject matter in its entirety, nor are the various illustrated and/or described implementations or embodiments intended to be limiting. Rather, the illustrated and/or described implementations or embodiments are provided as mere examples.

The present disclosure addresses these and other needs.

Other features of the illustrated and/or described implementations or embodiments will become apparent from the following detailed description, taken in conjunction with the accompanying drawings, which illustrate, by way of example, the principles of the illustrated and/or described implementations or embodiments.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with pulse generators, for example nanosecond pulse generators, voltage sources (e.g., batteries), loads (e.g., spark ignition sources, for example spark plugs), cables that couple pulse generators to spark ignition sources, for example coaxial cables, plasma generation, gas delivery systems, and/or internal combustion engines have not been shown or described in detail to avoid unnecessarily obscuring descriptions of the implementations and embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or at least one embodiment. Thus, the appearances of the phrases "in one implementation" or "in an implementation" or "in one embodiment" or "in an embodiment" in various places throughout this specification are not necessarily all referring to the same implementation or embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
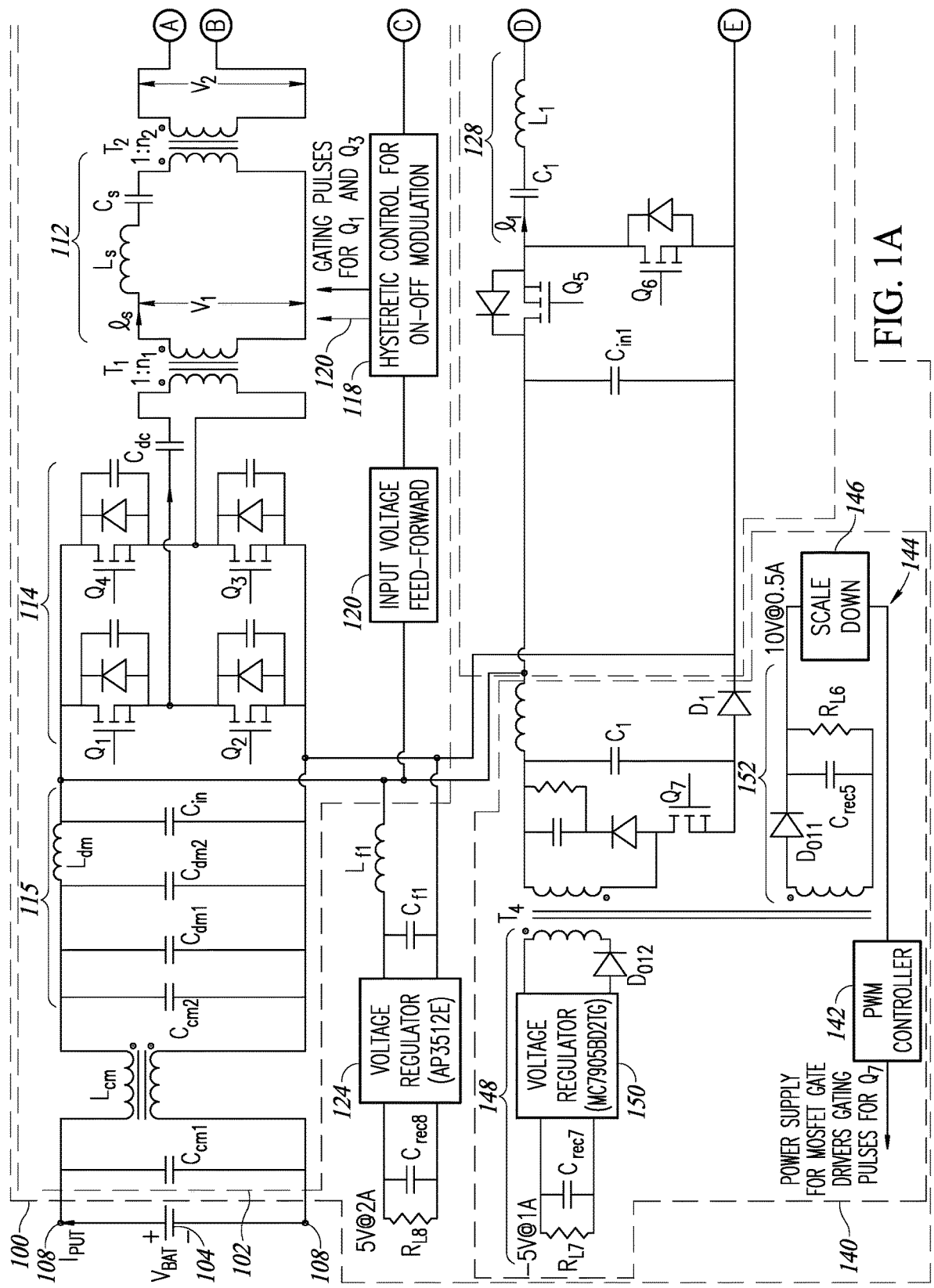
FIGS. 1A and 1B are a schematic diagram showing a power converter, a DC power supply and a load, according to at least one illustrated implementation, the power converter including a series resonant converter operable to provide high gain to produce short duration high voltage pulses, and optionally other converters and/or circuits for supplying auxiliary loads.
Figure 1B:
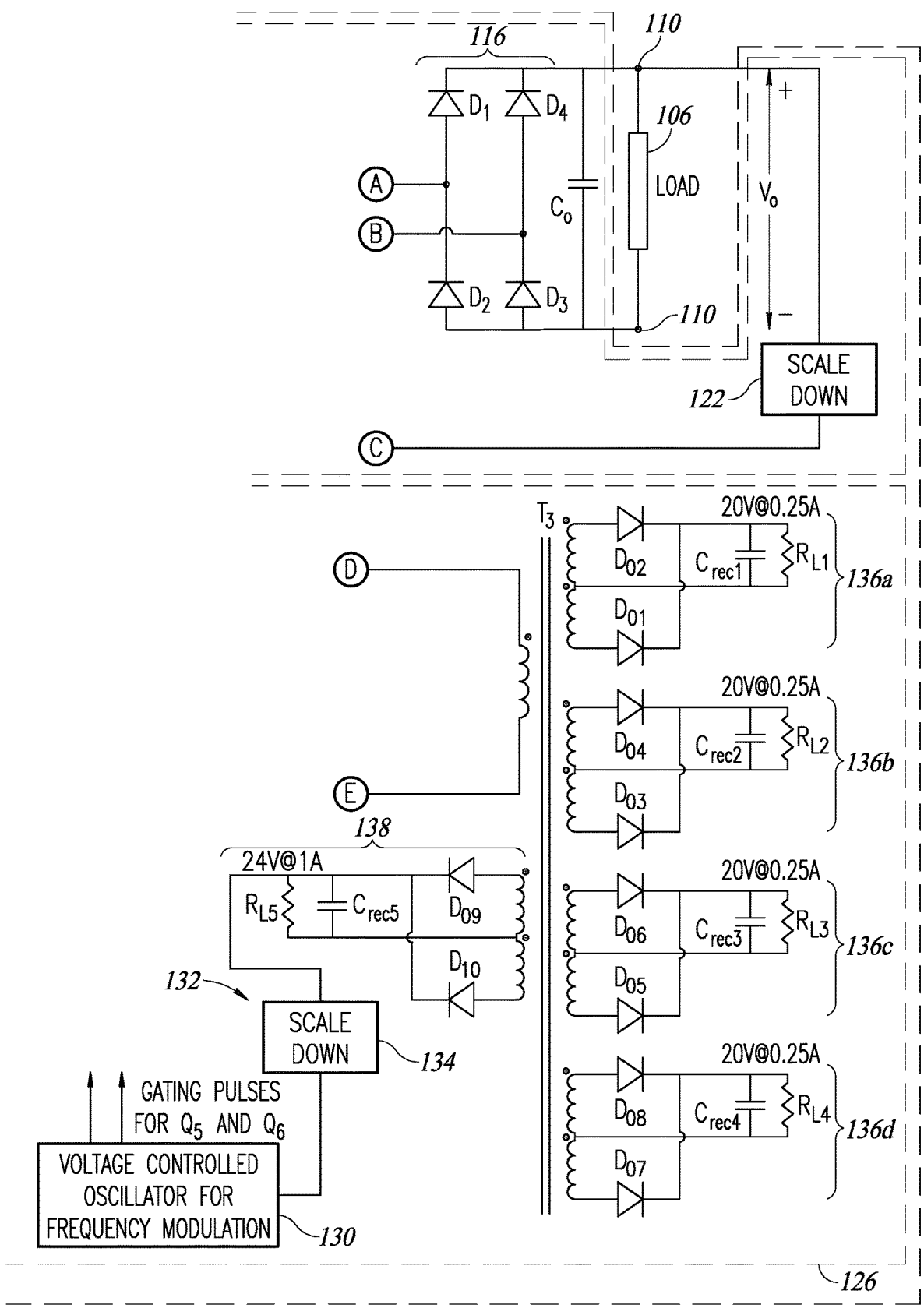

FIGS. 1A and 1B show a DC-DC power converter 100 including a first series resonant converter 102 electrically coupled to a DC supply ($V_{bat}$) 104 and a primary load (Load) 106, according to at least one illustrated implementation. The first series resonant converter 102 has a full-bridge series resonant topology.

The first series resonant converter 102 includes a set of input nodes 108 and a set of output nodes 110. The set of input nodes 108 electrically couple the first series resonant converter 102 to the DC supply 104. The set of output nodes 110 electrically couple the first series resonant converter 102 to the primary load 106.

The first series resonant converter 102 has a resonant tank 112 coupled between the set of input nodes 108 and the set of output nodes 110. The first series resonant converter 102 has a first transformer $T_1$ coupled between the set of input nodes 108 and the resonant tank 112, and a second transformer $T_2$ coupled between the resonant tank 112 and the set of output nodes 110. The resonant tank 112 can, for example, take the form of a tank inductor $L_S$, and a tank capacitor $C_S$ electrically coupled in series with the tank inductor $L_S$.

The first series resonant converter 102 includes a full bridge inverter circuit 114 coupled between the set of input nodes 108 and the first transformer $T_1$. The full bridge inverter circuit 114 comprises a set of active switches $Q_1$, $Q_2$, $Q_3$, $Q_4$, in an H-bridge configuration. For example, the full bridge inverter circuit 114 comprises four metal oxide semiconductor field effect transistors (MOSFETs). The first series resonant converter 102 includes a charging capacitor $C_{dc}$, coupled between the set of active switches $Q_1$, $Q_2$, $Q_3$, $Q_4$ in the H-bridge configuration and the first transformer $T_1$.

The first series resonant converter 102 can include an input filter 115 electrically coupled between the set of input nodes 108 and the full bridge inverter circuit 114. The input filter 115 can be comprised of filter capacitor $C_{cm2}$, filter capacitor $C_{dm1}$, filter capacitor $C_{dm2}$, filter capacitor $C_{in}$, and inductor $L_{dm1}$. The input filter 115 may be coupled to the DC supply 104 via an isolation transformer $L_{cm1}$ and a capacitor $C_{cm1}$ coupled across the input nodes 108.

The first series resonant converter 102 includes a rectifier circuit 116 coupled between the second transformer $T_2$ and the set of output nodes 110. The rectifier circuit 116 can, for example, take the form of a set of diodes $D_1$, $D_2$, $D_3$, $D_4$ electrically coupled across a secondary of the second transformer $T_2$ in a full bridge configuration. An output capacitor $C_o$ can be electrically coupled across the output nodes 110.

The full-bridge series resonant topology is advantageously operable to obtain a high voltage (e.g., equal to or greater than approximately 300V, equal to or greater than approximately 1500V) output from the relatively low voltage (e.g., approximately 9V-approximately 16V) input. The full-bridge series resonant topology can in at least some implementations obtain a voltage gain that is 18 to 167 times the input voltage or alternatively 94 to 167 times the input voltage.

The first series resonant converter 102 includes a control circuit 118 communicatively coupled to control operation of the set of active switches $Q_1$, $Q_2$, $Q_3$, $Q_4$. In particular, the control circuit 118 supplies control signals 120 to, during an ON period when power is to be supplied to the primary load 106 via the set of output nodes 110 operate the active switches $Q_1$, $Q_2$, $Q_3$, $Q_4$ at a first frequency, and during an OFF period when power is not to be supplied to the primary load 106 via the set of output nodes 110 operate the active switches $Q_1$, $Q_2$, $Q_3$, $Q_4$ at a second frequency, the second frequency different than the first frequency. In some implementations, the second frequency is higher than the first frequency (e.g., two times higher). In other implementations, the second frequency is lower than the first frequency. The first frequency and the second frequency are preferably non-zero frequencies.

The first series resonant converter 102 may employ a feedforward control loop 120. The feedforward control loop 120 employs a sensed input voltage, optional scaler 122 to scale the sensed voltage, and the control circuit 118 sets an operating frequency of the active switches $Q_1$, $Q_2$, $Q_3$, $Q_4$ based at least in part on the sensed input voltage to control a gain of the first series resonant converter 102. Such may advantageously reduce stresses and Root Mean Square (rms) currents through one or more components of the first series resonant converter 102.

The DC-DC power converter 100 can include various circuits operable to supply various auxiliary loads, for instance to supply: 4×20V, 0.25 A auxiliary loads; a 1×24V, 1 A auxiliary load; 1×10V, 0.5 A auxiliary load; 1×5V, 2 A auxiliary load; and a −5V, 1 A auxiliary load.

For example, the DC-DC power converter 100 can employ a buck switching voltage regulator IC 124 to supply an auxiliary load, for instance a 5V, 2 A auxiliary load. The buck switching voltage regulator IC 124 can be electrically coupled to the input filter 115 via a filter formed by an inductor $L_{f1}$ and capacitor c.

Also for example, the DC-DC power converter 100 can include a second series resonant converter 126 having a series resonant topology to supply other auxiliary loads.

The second series resonant converter 126 can include a pair of active switches $Q_5$, $Q_6$, a capacitor $C_1$ and a resonant tank 128 formed from an inductor $L_1$ electrically coupled in series with the capacitor $C_1$. The active switches $Q_5$, $Q_6$ can, for example, take the form of MOSFETs. The second series resonant converter 126 can be electrically coupled to the input filter 115 to receive an input voltage. The second series resonant converter 126 can include a second series resonant converter controller 130 that generates control signals (e.g., gating pulses) to control a state of each of the active switches $Q_5$, $Q_6$. The second series resonant converter 126 can take the form of, or otherwise include, a voltage controlled oscillator operable to achieve frequency modulation. The second series resonant converter 126 can employ feedforward loop 132, optionally with a scaler 134, coupled to the second series resonant converter controller 130. An isolation transformer $T_3$ couples the second series resonant converter 126 to four auxiliary supply circuits 136a, 136b, 136c, 136d comprised of diodes $D_{O1}$, $D_{O2}$, $D_{O3}$, $D_{O4}$, capacitors $C_{rec1}$, $C_{rec2}$, $C_{rec3}$, $C_{rec4}$, and resistors $R_{L1}$, $R_{L2}$, $R_{L3}$, $R_{L4}$, to supply 4×20V, 0.25 A auxiliary loads.

The isolation transformer $T_3$ also couples the second series resonant converter 126 to one auxiliary supply circuit 138 comprised of diodes $D_{O9}$, $D_{10}$, capacitor $C_{rec5}$, resistor $R_{L5}$ and scaler 134 to supply power (e.g., 1×24V, 1 A auxiliary load) to the voltage controlled oscillator of the second series resonant converter 126.

Also for example, the DC-DC power converter 100 can include a flyback converter 140 having a flyback topology to supply other auxiliary loads.

The flyback converter 140 can comprise an active switch $Q_7$, a capacitor $C_f$, an inductor $L_f$, and diode $D_f$ as well as other capacitors, resistors and diodes (not called out in Figures). The active switch Q, can, for example, take the form of MOSFETs. The flyback converter 140 can be electrically coupled to the input filter 115 to receive an input voltage. The flyback converter 140 can include a flyback converter controller 142 (e.g., a PWM controller) that generates control signals (e.g., gating pulses) to control a state of the active switch $Q_7$. The flyback converter 140 can employ a feedforward loop 144, optionally with a scaler 146, coupled to the flyback converter controller 142.

An isolation transformer $T_4$ couples the flyback converter 140 to auxiliary supply circuit 148 comprised of a voltage regulator integrated circuit, a diode $D_{012}$, a capacitor $C_{rec7}$, and a resistor $R_{L7}$, to supply 1×–5V, 1 A auxiliary load.

The isolation transformer $T_4$ also couples the flyback converter 140 to a power supply 152 for gate drivers comprised of a diode $D_{011}$, a capacitor $C_{rec6}$, and a resistor $R_{L6}$, and scaler coupled to supply 1×10V, 0.5 A to the PWM controller 142.

Figure 2:
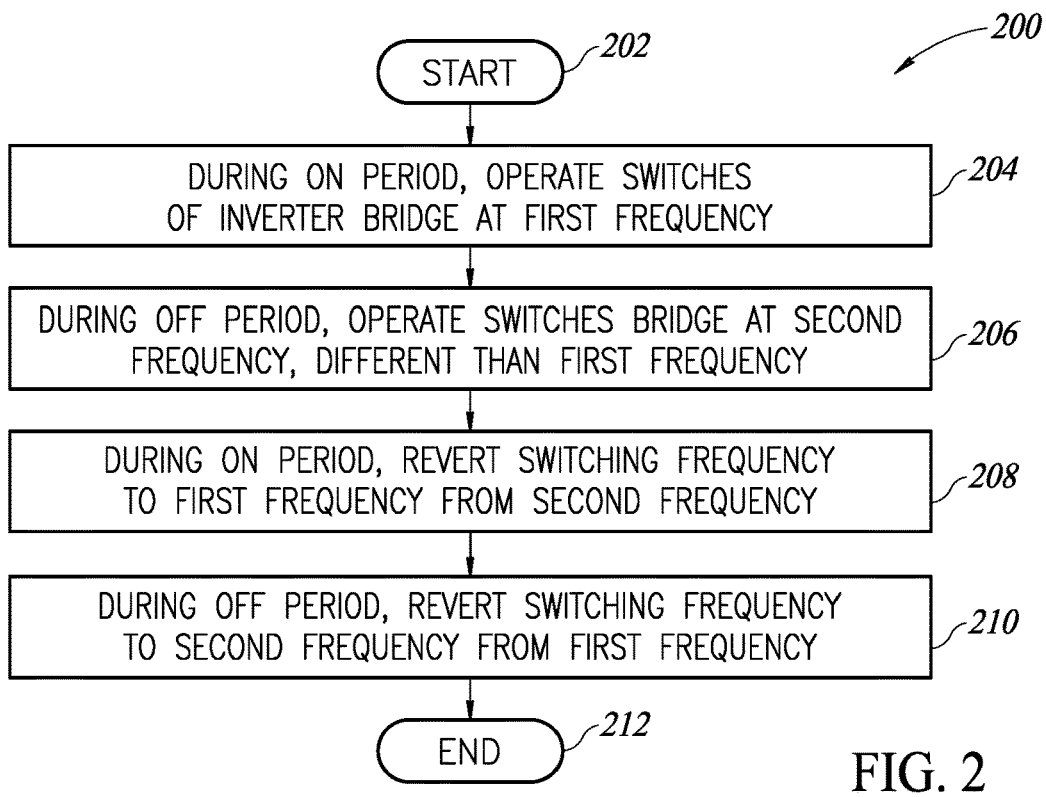
FIG. 2. is a flow diagram showing a method operating the series resonant converter of FIGS. 1A and 1B, according to at least one illustrated implementation.

FIG. 2 shows a method 200 of operating a series resonant converter (FIGS. 1A and 1B), according to at least one illustrated implementation.

The method 200 starts at 202, for example in response to a powering of the DC-DC power converter 100, a command or other invocation.

At 204, during an ON period when power is to be supplied to a load via a set of output nodes, a control circuit operates a set of switches of an inverter bridge at a first frequency. At 206, during an OFF period when power is not to be supplied to the load via the set of output nodes, the control circuits operate the switches at a second frequency, the second frequency different than the first frequency.

At 208, during an ON period (e.g., an initial ON period, a subsequent ON period), the control circuit reverts the switching frequency to the first frequency from the second frequency. For example, the control circuit may gradually revert the switching frequency to the first frequency from the second frequency.

At 210, during an OFF period (e.g., an initial OFF period, a subsequent OFF period), the controller reverts the switching frequency to the second frequency from the first frequency. For example, the control circuit may gradually revert the switching frequency to the second frequency from the first frequency.

In at least some implementations, operating the active switches at a second frequency comprises operating the active switches at the second frequency which is higher than the first frequency. In at least some implementations, operating the active switches at a second frequency comprises operating the active switches at the second frequency which is lower than the first frequency. In at least some implementations, operating the DC-DC power converter includes operating the full-bridge series resonant topology to obtain the high voltage of equal to or greater than approximately 300V or equal to or greater than approximately 1500V output from the relatively low voltage of between approximately 9V to approximately 16V input. In at least some implementations, i) operating the active switches at the first frequency, and ii) operating the active switches at the second frequency, includes operating the active switches at a non-zero frequencies that are not equal to one another.

In some implementations, the DC-DC power converter is not operated at the resonant frequency of the series LC tank, either during the ON period of during the OFF period. For example, the ON-state switching frequency can advantageously be slightly above the resonant frequency of the series LC tank to achieve higher efficiency by means of zero-voltage switching. Also for example, the OFF-state frequencies can advantageously be far above or far below the resonant frequency of the series LC tank to be sufficiently far away from resonance that very little energy couples into the resonant circuit. Using an OFF-state frequency that is two times the value of ON-state frequency, which is itself slightly above resonant of the series LC tank, may be preferred, although any frequency that is sufficiently above or below the narrow pass-band of the resonant circuit can be employed.

Figure 3:
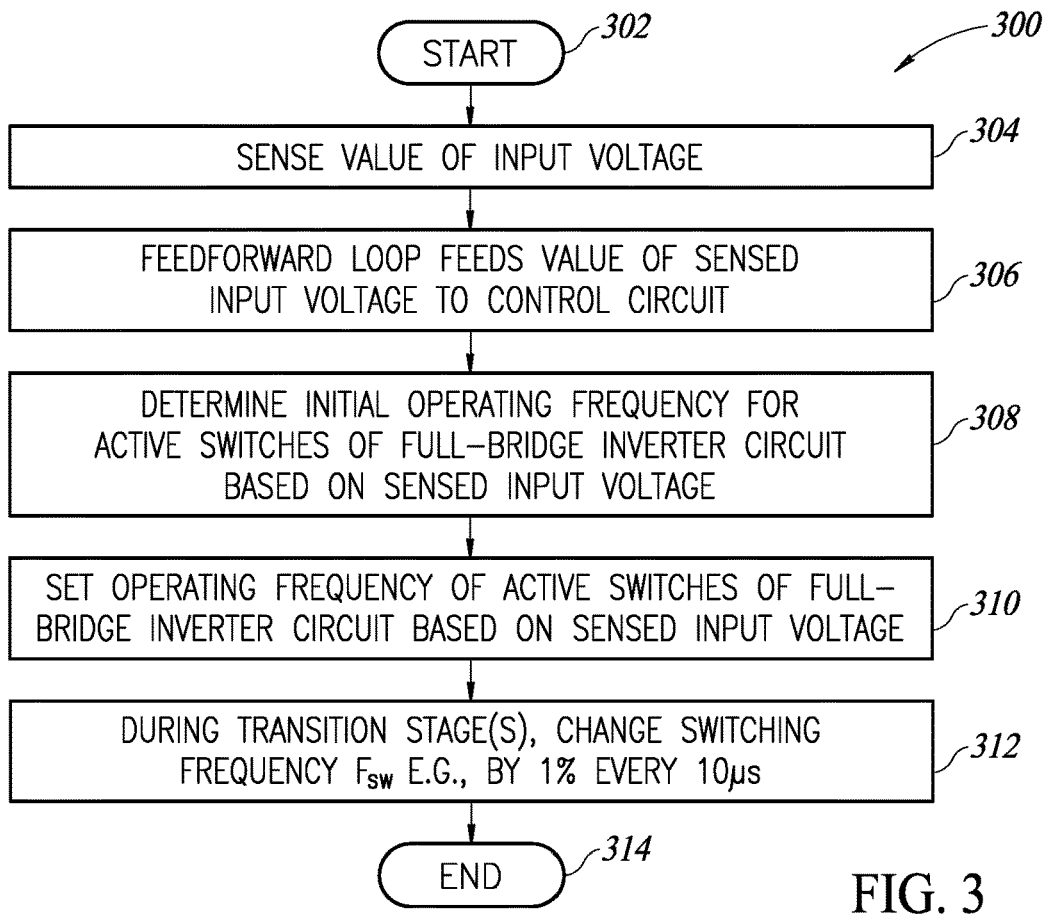
FIG. 3 is a flow diagram showing a method operating the series resonant converter of FIGS. 1A and 1B, according to at least one illustrated implementation.

The method 200 ends at 212, for example until invoked again. In some implementations, the method 200 may repeat continuously, continually, periodically or aperiodically FIG. 3 shows a method 300 of operating a series resonant converter (FIGS. 1A and 1B), according to at least one illustrated implementation.

The method 300 starts at 302, for example in response to a powering of the DC-DC power converter 100, a command or other invocation.

At 304, at least one sensor or circuit sense a value of an input voltage. At 306, a feedforward loop feeds or otherwise provides an indication of the value of the sensed input voltage to a control circuit.

At 308, the control circuit determines an operating frequency of a set of active switches of a full-bridge inverter circuit based at least in part on the sensed input voltage to control a gain of a first series resonant converter, and thereby reduce stresses and Root Mean Square (rms) currents through one or more components of the first series resonant converter. For example, to set the operating frequency of a set of active switches the control circuit can set the operating frequency to produce a gain that is from approximately 18 to approximately 167 times the input voltage or alternatively approximately 94 to approximately 167 times the input voltage. For example, in at least some implementations, the control circuit can set the operating frequency of the set of active switches of the full-bridge inverter circuit to an initial switching frequency $f_s$ via the formula $$f_s = \left(\frac{3V_{bat}+15}{35}\right)*250 \text{ kHz,}$$

wherein $V_{bat}$ is the input voltage. For example, in at least some implementations, the control circuit can set an initial switching frequency $f_s$ via the formula $$f_s = \left(\frac{3V_{bat}+15}{35}\right)*250 \text{ kHz,}$$

wherein $V_{bat}$ is the input voltage.

At 310, the control circuit sets an operating frequency of a set of active switches of a full-bridge inverter circuit based at least in part on the sensed input voltage to control a gain of a first series resonant converter. The control circuit sets an operating frequency of a set of active switches by providing hysteretic control signals for ON/OFF modulation of the active switches.

At 312, during transition stages, changing the switching frequency $f_{sw}$ by 1% every 10 µs.

The method 300 ends at 314, for example until invoked again. In some implementations, the method 300 may repeat continuously, continually, periodically or aperiodically.

Figure 4:
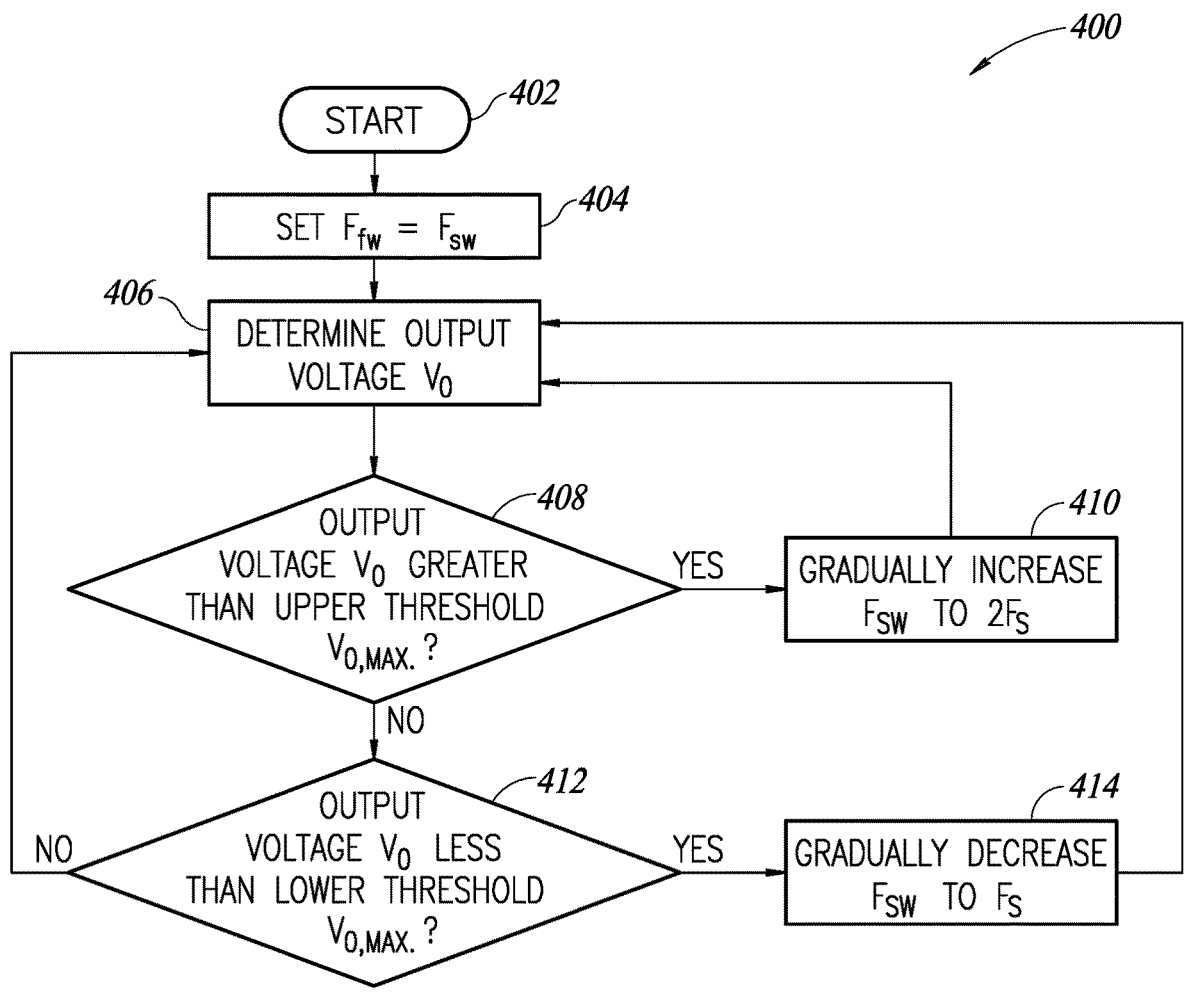
FIG. 4 is a flow diagram showing a method operating the series resonant converter of FIGS. 1A and 1B, according to at least one illustrated implementation.

FIG. 4 shows a method 400 of operating a series resonant converter (FIGS. 1A and 1B), according to at least one illustrated implementation.

The method 400 starts at 402, for example in response to a powering of the DC-DC power converter 100, a command or other invocation.

At 404, a controller sets a switching frequency $f_{sw}$ equal to an initial switching frequency $f_s$.

At 406, the controller measures or otherwise determines a value of the output voltage $V_o$.

At 408, the controller determines whether the output voltage $V_o$ is greater than an upper threshold $V_{o,max}$. If it is determined that the output voltage $V_o$ is greater than the upper threshold $V_{o,max}$, then at 410 the controller gradually increases the switching frequency $f_{sw}$, for example increasing a switching frequency $F_{sw}$ to two times the initial switching frequency $f_s$, and returning control to 406. Otherwise, control passes to 412.

At 412, the controller determines whether the output voltage $V_o$ is less than a lower threshold $V_{o,min}$. If it is determined that the output voltage $V_o$ is less than the lower threshold $V_{o,min}$, then at 414 the controller gradually decreases the switching frequency, for example decreasing the switching frequency $F_{sw}$ to one times the initial switching frequency $f_s$, and returning control to 406. Otherwise, control passes to directly to 412 without gradually decreasing the switching frequency $F_{sw}$.

As noted above, portions of the method 400 may repeat continually, for example while power is supplied to the power converter.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to commonly owned: U.S. Pat. No. 10,072,629; U.S. patent application Ser. No. 16/254,140; U.S. patent application Ser. No. 16/254,146; U.S. patent application Ser. No. 12/703,078; U.S. provisional patent application 62/699,475; U.S. provisional patent application 62/844,587; U.S. provisional patent application 62/844,574; U.S. provisional patent application 63/177,102; U.S. provisional patent application 63/228,462; and U.S. patent application Ser. No. 16/861,658, are each incorporated herein by reference, in their entirety.

Aspects of the implementations can be modified, if necessary, to employ systems, circuits and concepts of the various patents, applications and publications to provide yet further implementations.

The various embodiments and examples described above are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

We claim:

1. A DC-DC power converter comprising a first series resonant converter having a full-bridge series resonant topology, the first series resonant converter comprising:
   a set of input nodes;
   a set of output nodes;
   a resonant tank coupled between the set of input nodes and the set of output nodes;
   a first transformer coupled between the set of input nodes and the resonant tank;
   a second transformer coupled between the resonant tank and the set of output nodes;
   a full bridge inverter circuit coupled between the set of input nodes and the first transformer;
   a rectifier circuit coupled between the second transformer and the set of output nodes, wherein the full-bridge series resonant topology is operable to obtain a high voltage output from a relatively low voltage input; and
   a control circuit communicatively coupled to control operation of the a set of active switches to, during an ON period when power is to be supplied to a load via the set of output nodes operate the active switches at a first frequency, and during an OFF period when power is not to be supplied to the load via the set of output nodes operate the active switches at a second frequency, the second frequency different than the first frequency and wherein the second frequency is higher than the first frequency or the second frequency is lower than the first frequency.

2. The DC-DC power converter of claim 1 wherein the full bridge inverter circuit comprises the set of active switches in an H-bridge configuration and the resonant tank comprises an inductor and a capacitor electrically coupled with the inductor.

3. The DC-DC power converter of claim 2, further comprising:

a capacitor coupled between the set of active switches in the H-bridge configuration and the first transformer.

4. The DC-DC power converter of claim 1, further comprising:
a feedforward control loop which senses an input voltage and in which the control circuit sets an operating frequency of the active switches based at least in part on the sensed input voltage to control a gain of the first series resonant converter and reduce stresses and Root Mean Square (rms) currents through one or more components of the first series resonant converter.

5. The DC-DC power converter of claim 4 wherein the gain is 18 to 167 times the input voltage.

6. The DC-DC power converter of claim 4 wherein the control circuit sets an initial switching frequency fs via a formula f_s=((3V_bat+15)/35)*250 kHz, wherein Vbat is the input voltage.

7. The DC-DC power converter of claim 6 wherein the control circuit, during transition stages, changes a switching frequency $f_{sw}$ by 1% every 10 μs.

8. The DC-DC power converter of claim 1 wherein the full bridge inverter circuit comprises four metal oxide semiconductor field effect transistors (MOSFETs).

9. The DC-DC power converter of claim 1 wherein the input nodes are coupled to a battery.

10. The DC-DC power converter of claim 1, further comprising:
an input filter electrically coupled between the set of input nodes and the full bridge inverter circuit.

11. The DC-DC power converter of claim 1 wherein the full-bridge series resonant topology is operable to obtain the high voltage of equal to or greater than approximately 300V to approximately 1500V output from the relatively low voltage of between approximately 9V-approximately 16V input.

12. The DC-DC power converter of claim 1 wherein neither the first frequency nor the second frequency is zero, and the first frequency and the second frequency are both non-resonance frequencies for the DC-DC power converter.

13. A method of operating a DC-DC power converter comprising a first series resonant converter having a full-bridge series resonant topology, the method comprising:
during an ON period when power is to be supplied to a load via a set of output nodes, operating a set of active switches of an inverter bridge at a first frequency, and during an OFF period when power is not to be supplied to the load via the set of output nodes, operating the active switches at a second frequency, the second frequency different than the first frequency, and wherein the second frequency is higher than the first frequency or the second frequency is lower than the first frequency.

14. The method of claim 13, further comprising:
during the ON period, gradually reverting a switching frequency to the first frequency from the second frequency.

15. The method of claim 13, further comprising:
during the OFF period, gradually reverting a switching frequency to the second frequency from the first frequency.

16. The method of claim 13, further comprising:
sensing an input voltage;
providing the sensed input voltage to a control circuit;
setting an operating frequency of a set of active switches of a full-bridge inverter circuit based at least in part on the sensed input voltage to control a gain of a first series resonant converter and reduce stresses and Root Mean Square (rms) currents through one or more components of the first series resonant converter.

17. The method of claim 16 wherein setting the operating frequency of a set of active switches includes setting the operating frequency to produce a gain that is 18 to 167 times the input voltage.

18. The method of claim 16 wherein setting the operating frequency of a set of active switches of a full-bridge inverter circuit based at least in part on the sensed input voltage includes setting an initial switching frequency fs via a formula f_s=((3V_bat+15)/35)*250 kHz, wherein Vbat is the input voltage.

19. The method of claim 16, further comprising, during transition stages, changing a switching frequency fsw by 1% every 10 μs.

20. The method of claim 13 wherein operating the DC-DC power converter includes operating the full-bridge series resonant topology to obtain a high voltage of equal to or greater than approximately 300V to approximately 1500V output from a relatively low voltage of between approximately 9V-approximately 16V input.

21. The method of claim 13 wherein neither: i) operating the active switches at the first frequency, nor ii) operating the switches at the second frequency includes operating the active switches at a zero frequency, and at least one of the first frequency or the second frequency is a non-resonance frequency for the DC-DC power converter.

* * * * *